No. 642,282. Patented Jan. 30, 1900.
M. BARCLAY.
HOOK.
(Application filed May 25, 1899.)
(No Model.)
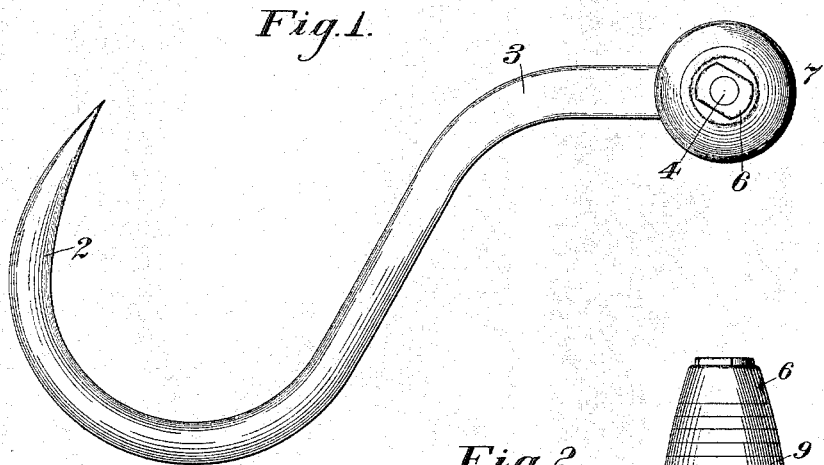
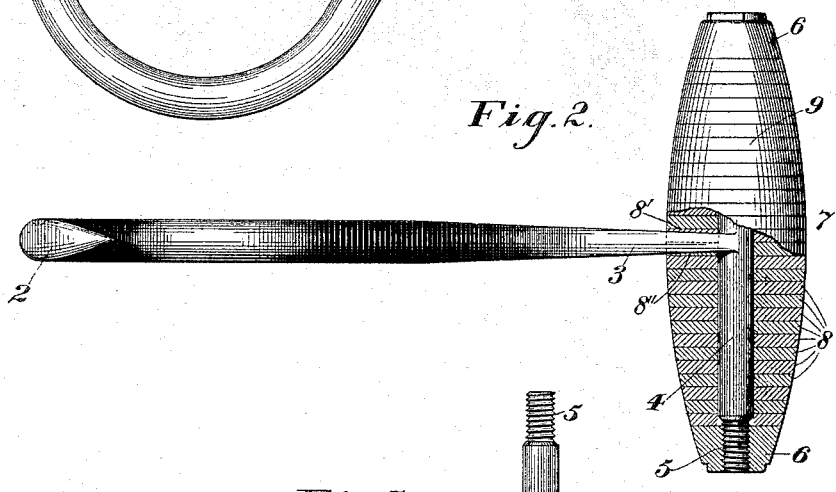
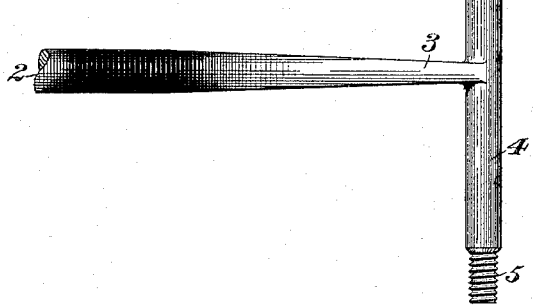
Witnesses:
A. B. Mattingly
J. L. Edwards Jr.
Inventor.
Malcolm Barclay.
By his Attorney
F. H. Richards.

UNITED STATES PATENT OFFICE.

MALCOLM BARCLAY, OF CARLTON HILL, NEW JERSEY.

HOOK.

SPECIFICATION forming part of Letters Patent No. 642,282, dated January 30, 1900.

Application filed May 25, 1899. Serial No. 718,251. (No model.)

*To all whom it may concern:*

Be it known that I, MALCOLM BARCLAY, a citizen of the United States, residing in Carlton Hill, in the county of Bergen and State of New Jersey, have invented certain new and useful Improvements in Hooks, of which the following is a specification.

This invention relates to hooks, and especially to that class of hooks ordinarily designated as "bale-hooks;" and the object of the invention is to provide an improved hook in which the handle and the shank of the hook are so connected that for all practical purposes they constitute an integral structure, whereby to prevent in use the disconnection of the handle from the hook.

A further object of the invention is to provide a hook of the character set forth in which one member of the handle will be integral with the hook portion of the device, whereby the disconnection of the handle from the hook is rendered impossible.

In the drawings accompanying and forming part of this specification, Figure 1 is a side view of one form of this hook. Fig. 2 is a view of the hook in a different position from that shown in Fig. 1 with the handle partly in section, and Fig. 3 is a portion of the hook detached from one part of the handle.

Similar characters of reference designate like parts in all the figures of the drawings.

Bale-hooks as ordinarily constructed and in daily use have the shank of the hook projecting through the handle, such handle being secured to the shank by a nut turned on the threaded end thereof. The result of this construction is that in practice the threads become worn under the strain and the handle parts from the hook, which frequently results in disastrous consequences to the users. My present invention is to provide an improved hook in which the handle is so connected with the hook that it practically forms an integral structure therewith, and for this purpose the handle is so constructed in one form thereof as to comprise two members, one of which is shown as integral with the hook-shank.

In the construction shown this device comprises a hook 2, having a shank 3, shown as relatively flat, which shank is provided with a transversely-extending member or bar 4, secured thereto and shown herein as integral therewith, and which member is provided at each end thereof with threads 5 for the reception of nuts 6. The grasping portion or handle proper, 7, of this hook may comprise any suitable material; but in the form shown it is preferably composed of leather or rawhide covering the transversely-extending member 4, and for this purpose this part of the handle is formed of a series of sections, such as rings 8, centrally bored to fit onto said transversely-extending member on each side of the shank and having an exterior surface 9, suitable for grasping with the hand.

In the form shown the two inner rings 8' and 8'' are recessed to receive the shank, whereby they completely inclose the same. Suitable means may be used for securing the rings or sections in position on the transverse member. In the form shown this means comprises a pair of nuts 6, turned onto the threaded ends of said member and of a diameter corresponding with the diameter of the contiguous ring-section 8, the outer surface thereof being shaped to correspond with the shape of the handle. By this means not only are the rings or sections held in position, but they may be pressed into such close relationship relatively to each other that they practically form one integral structure.

From the foregoing it will be readily seen that the leather portion of the handle acts merely as a grasping-surface, while strain comes on the transversely-extending member or bar 4, so that in practice all danger of the handle becoming separated from the hook is avoided. Furthermore, it will be seen that by the formation of the ring-shaped sections the same can be readily assembled in position and maintained in close engagement one with another, while at the same time the recessed formation of the two inner sections permits a close engagement thereof with the shank of the hook.

Having described my invention, I claim—

1. A bale-hook having a shank provided with an integral transversely-extending member the parts thereof at each side of said shank extending in a plane throughout substantially at right angles to said shank; a grasping portion inclosing said transversely-extending member; and means for maintaining said grasping portion in position.

2. A bale-hook having a shank provided with a transversely-extending member integral therewith the parts at each side of said shank extending in a plane throughout substantially at right angles to said shank, and a grasping portion comprising a series of independent sections secured on said transversely-extending member.

3. A bale-hook having a shank provided with an integral member extending transversely thereof and having threads at its ends, and a grasping portion completely inclosing said transversely-extending member and maintained in position by nuts on said threaded ends.

4. A bale-hook having a shank provided with a transversely-extending member integral therewith and having threaded ends; a grasping portion comprising a series of rings removable from said transversely-extending member; and nuts for securing said rings in position thereon.

5. A bale-hook having a shank and a transversely-extending member integral therewith provided with a pair of threaded ends; a grasping portion comprising a series of centrally-apertured leather rings fitting on said transverse member; and nuts carried by said threaded ends for maintaining said rings in position.

6. A bale-hook having a shank provided with a transversely-extending member integral therewith having threaded ends; a series of centrally-apertured ring-shaped sections fitting on said transversely-extending member, the two inner sections having recesses for the reception of said shank; and nuts for maintaining said sections in position.

7. A bale-hook having a flat shank provided with a transversely-extending member integral therewith having threaded ends; a series of centrally-apertured ring-shaped leather sections fitting on said transversely-extending member, the two inner sections having recesses for the reception of said flat shank; and nuts carried by said threaded ends for maintaining said sections in position, said sections when assembled forming a handle curved from end to end and of greater diameter adjacent to its center portion than at its ends.

MALCOLM BARCLAY.

Witnesses:
JAMES D. MACPHERSON,
FRED. J. DOLE.